United States Patent
Dudar

(10) Patent No.: US 10,938,225 B2
(45) Date of Patent: Mar. 2, 2021

(54) VEHICLE CHARGE TERMINATION SYSTEM AND METHOD

(71) Applicant: FORD GLOBAL TECHNOLOGIES, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1168 days.

(21) Appl. No.: 14/931,075

(22) Filed: Nov. 3, 2015

(65) Prior Publication Data

US 2017/0126033 A1 May 4, 2017

(51) Int. Cl.
| | |
|---|---|
| *H02J 7/00* | (2006.01) |
| *B60L 3/00* | (2019.01) |
| *B60L 3/04* | (2006.01) |
| *B60L 53/18* | (2019.01) |
| *B60L 53/14* | (2019.01) |
| *B60L 53/30* | (2019.01) |
| *B60K 6/40* | (2007.10) |
| *B60K 6/445* | (2007.10) |

(52) U.S. Cl.
CPC .............. *H02J 7/0026* (2013.01); *B60K 6/40* (2013.01); *B60K 6/445* (2013.01); *B60L 3/0015* (2013.01); *B60L 3/04* (2013.01); *B60L 53/14* (2019.02); *B60L 53/18* (2019.02); *B60L 53/30* (2019.02); *H02J 7/0027* (2013.01); *B60Y 2200/92* (2013.01); *Y02T 10/70* (2013.01); *Y02T 10/7072* (2013.01); *Y02T 90/12* (2013.01); *Y02T 90/14* (2013.01); *Y10S 903/952* (2013.01)

(58) Field of Classification Search
CPC ..................................................... H02J 7/0026
USPC ............................................................ 320/109
See application file for complete search history.

(56) References Cited

U.S. PATENT DOCUMENTS

| | | | | |
|---|---|---|---|---|
| 5,548,200 A | * | 8/1996 | Nor ........................ | B60L 11/184 320/106 |
| 8,307,934 B2 | | 11/2012 | Rini et al. | |
| 8,368,354 B2 | * | 2/2013 | Endo ....................... | B60K 6/365 320/104 |
| 8,565,930 B2 | * | 10/2013 | Miwa ...................... | B60L 50/61 700/292 |
| 8,653,788 B2 | * | 2/2014 | Masuda .................... | B60L 3/04 320/109 |
| 8,886,490 B2 | | 11/2014 | Baek | |
| 2002/0079868 A1 | * | 6/2002 | Gaza ...................... | H02J 7/0031 320/155 |

(Continued)

FOREIGN PATENT DOCUMENTS

| | | |
|---|---|---|
| CN | 201638744 | 11/2010 |
| CN | 102481853 | 5/2012 |

(Continued)

*Primary Examiner* — Yalkew Fantu
(74) *Attorney, Agent, or Firm* — David Kelley, Esq.; Carlson, Gaskey & Olds, P.C.

(57) ABSTRACT

A charge termination system according to an exemplary aspect of the present disclosure includes, among other things, a switch configured to transition from a first position to a second position and a charging circuit extending to an external power source. The switch in the first position permits the charging circuit to charge an electrified vehicle. The switch in the second position prevents the charging circuit from charging the electrified vehicle.

18 Claims, 2 Drawing Sheets

(56) References Cited

U.S. PATENT DOCUMENTS

| | | | | |
|---|---|---|---|---|
| 2007/0026711 A1* | 2/2007 | Chorian | ................ | B60L 3/0007 |
| | | | | 439/174 |
| 2013/0038286 A1* | 2/2013 | Thomas | ................ | H02J 7/0004 |
| | | | | 320/109 |
| 2014/0239891 A1* | 8/2014 | Martin | .................. | B60L 11/182 |
| | | | | 320/108 |
| 2015/0112526 A1* | 4/2015 | Martin | ............... | G01C 21/3697 |
| | | | | 701/22 |

FOREIGN PATENT DOCUMENTS

| | | |
|---|---|---|
| CN | 103260940 | 8/2013 |
| EP | 0628980 | 7/1997 |
| WO | 2015051863 | 4/2015 |

\* cited by examiner

VEHICLE CHARGE TERMINATION SYSTEM AND METHOD

TECHNICAL FIELD

This disclosure relates generally to terminating a charge of an electrified vehicle in response to an impact event.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Charging a traction battery of an electrified vehicle, such as a PHEV, can involve electrically coupling the electrified vehicle to an external power source. The electrified vehicle can include electrically powered impact sensors that are not active when the external power source is charging the traction battery. For example, electrically powered impact sensors associated with a restraint control module are typically inactive when the external power source is charging the traction battery.

SUMMARY

A charge termination system according to an exemplary aspect of the present disclosure includes, among other things, a switch configured to transition from a first position to a second position, and a charging circuit extending to an external power source. The switch in the first position permits the charging circuit to charge an electrified vehicle. The switch in the second position prevents the charging circuit from charging the electrified vehicle.

In a further non-limiting embodiment of the foregoing system, the switch is a passive switch.

In a further non-limiting embodiment of any of the foregoing systems, the switch is an inertia switch.

In a further non-limiting embodiment of any of the foregoing systems, the switch is configured to transition from the first position to the second position in response to movement of the electrified vehicle relative to a charging station.

In a further non-limiting embodiment of any of the foregoing systems, the switch is within the electrified vehicle.

In a further non-limiting embodiment of any of the foregoing systems, the switch is at least partially within a receptacle that engages a vehicle charger plug of a charger assembly.

In a further non-limiting embodiment of any of the foregoing systems, the system includes a charging cord of a charger assembly. The charging cord holds the switch.

In a further non-limiting embodiment of any of the foregoing systems, the system includes a vehicle charger plug of a charger assembly. The charger plug holds the switch.

In a further non-limiting embodiment of any of the foregoing systems, the switch in the first position permits the charging circuit to charge the electrified vehicle when the electrified vehicle is stationary.

In a further non-limiting embodiment of any of the foregoing systems, the switch is configured to transition from the first position to the second position when the electrified vehicle is in a key-off state.

An electrified vehicle charge termination method according to another exemplary aspect of the present disclosure includes, among other things, charging an electrified vehicle using a charging station, and in response to a relative movement between the electrified vehicle and the charging station, transitioning a switch from a first position that permits the charging to a second position that prevents the charging.

In a further non-limiting embodiment of the foregoing method, the electrified vehicle is keyed off during the charging.

In a further non-limiting embodiment of any of the foregoing methods, the switch is an inertia switch.

In a further non-limiting embodiment of any of the foregoing methods, the switch is a passive switch.

In a further non-limiting embodiment of any of the foregoing methods, the method includes holding the switch within the electrified vehicle.

In a further non-limiting embodiment of any of the foregoing methods, the method includes holding the switch within a vehicle charger plug of the charger assembly.

In a further non-limiting embodiment of any of the foregoing methods, the method includes holding the switch within a charger cable of the charger assembly.

In a further non-limiting embodiment of any of the foregoing methods, the switch opens a charging circuit extending between a grid power source and the electrified vehicle.

In a further non-limiting embodiment of any of the foregoing methods, a restraint control module of the electrified is off during the charging.

In a further non-limiting embodiment of any of the foregoing methods, the method further comprises transmitting a communication from the electrified vehicle in response to the relative movement, the transitioning, or both.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to charging a traction battery of an electrified vehicle using a charging station, and to terminating the charging in response to an impact event.

Figure 1:
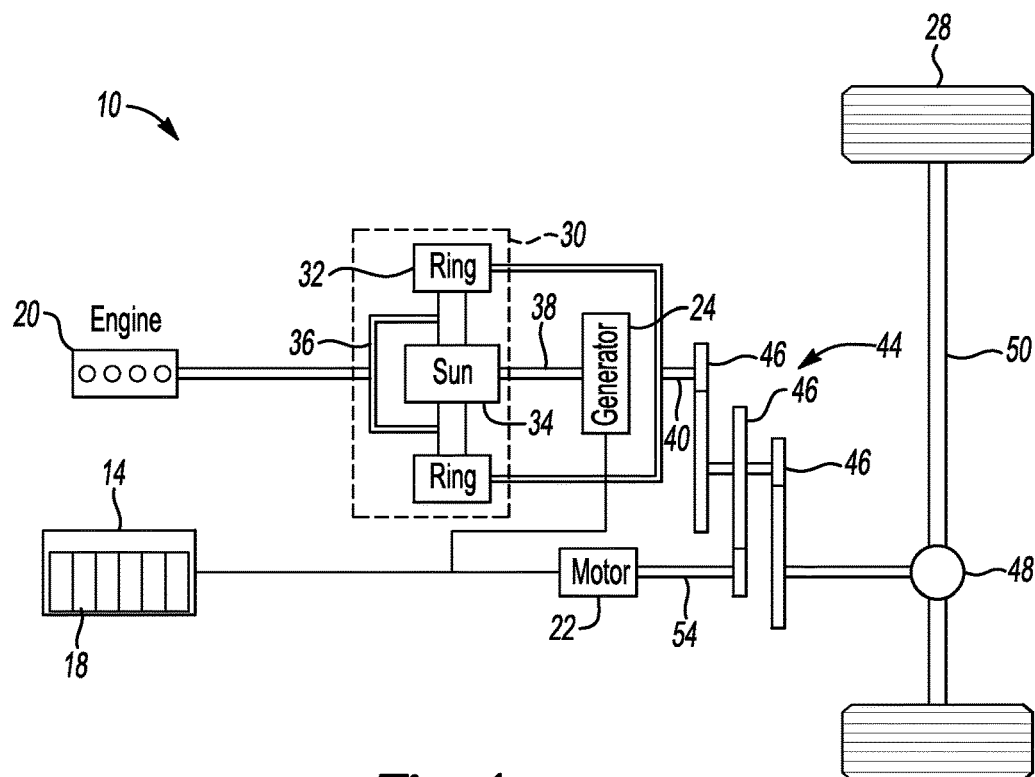
FIG. 1 shows an example electrified vehicle powertrain.

Referring to FIG. 1, a powertrain 10 of a plug-in hybrid electric vehicle (PHEV) includes a traction battery 14 having battery cells 18. The powertrain 10 further includes an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery 14.

Figure 2:
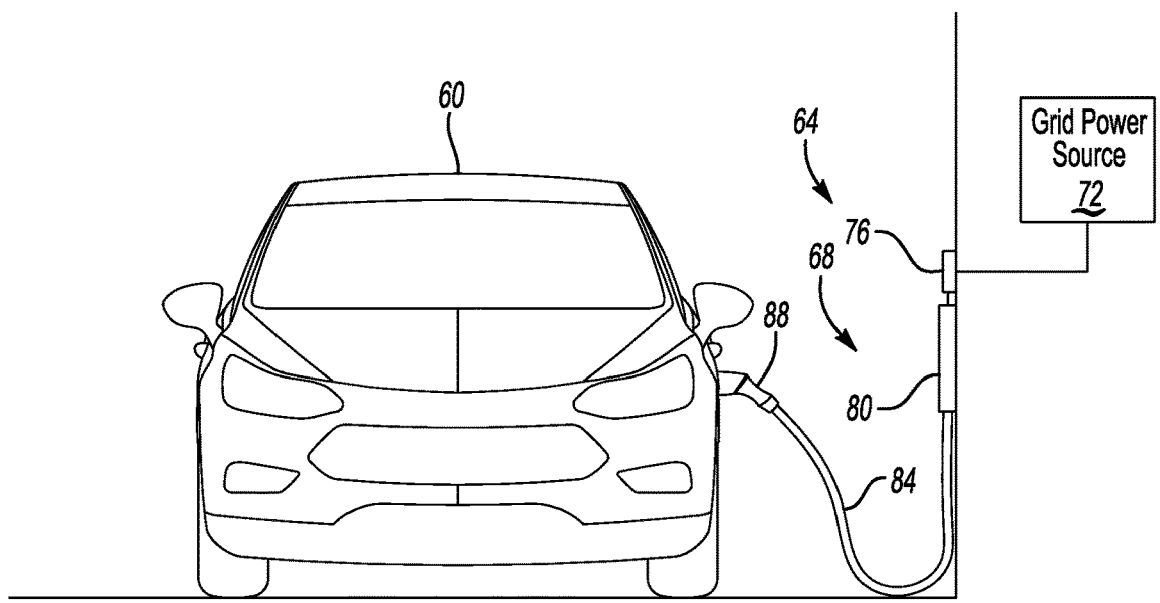
FIG. 2 shows an example electrified vehicle incorporating the electrified vehicle powertrain of FIG. 1 and in a charging position at a charging station.

Referring to FIG. 2 with continuing reference to FIG. 1, an example electrified vehicle 60 incorporates the powertrain 10 of FIG. 1. The example electrified vehicle 60 is a plug-in hybrid electric vehicle. The electrified vehicle 60 is shown in a charging position where the electrified vehicle is electrically coupled to a charging station 64.

The charging station 64 includes a tether-type charger assembly 68 and a grid power source 72. The charger assembly 68 conveys power from the grid power source 72 to the electrified vehicle 60. In this example, the charger assembly 68 includes a wall outlet plug 76, a charger body 80 within a housing, a charger cable 84, and a vehicle charger plug 88.

Charging the electrified vehicle 60 using the charging station 64 involves positioning the electrified vehicle 60 near the charging station 64 and electrically coupling the vehicle charger plug 88 to the electrified vehicle 60. Power can then move from the grid power source 72 to the electrified vehicle 60, and specifically the traction battery 14 of the powertrain 10.

When the electrified vehicle 60 is stationary, the electrified vehicle 60 is electrically coupled to the vehicle charger plug 88, and the wall outlet plug 76 is electrically coupled to the grid power source 72, the electrified vehicle 60 is in a charging position. The traction battery 14 can be charged when the electrified vehicle 60 is in the charging position.

The electrified vehicle 60 is typically in a keyed-off state when the electrified vehicle 60 is charging in the charging position. In this example, the electrical systems unrelated to charging the electrified vehicle 60 are not active or powered when the electrified vehicle 60 is charging in the charging position. When the electrified vehicle 60 is in the key-off state, many sensors used to detect impact events are not powered and thus do not detect impact events.

For example, the example electrified vehicle 60 includes a restraint control module having electrically powered sensors to detect impact events. The restraint control module is active when the electrified vehicle 60 is keyed-on. The restraint control is not active when the electrified vehicle 60 is keyed-off to, among other things, prevent airbags from inflating when not required. The electrically powered sensors of the restraint control module thus do not detect impact events when the electrified vehicle 60 is in the charging position. (Example impact events can include another vehicle contacting the electrified vehicle 60, which is stationary.)

Continuing charging the electrified vehicle 60 with power from the grid power source 72 after an impact event is often undesirable. The example electrified vehicle 60 incorporates features that terminate charging the electrified vehicle 60 with power from the grid power source 72 in response to an impact event.

Figure 3:
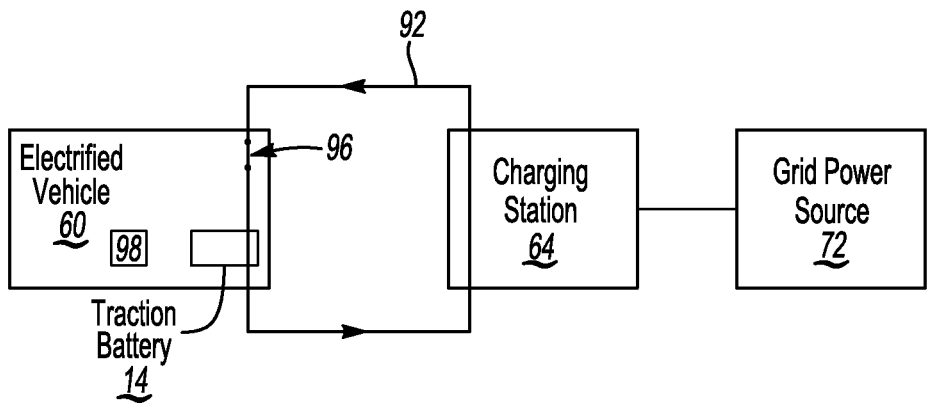
FIG. 3 shows a highly schematic view of the electrified vehicle and the charging station of FIG. 2.

Referring now to FIG. 3 with continuing reference to FIG. 2, electrically coupling the wall outlet plug 76 to the grid power source 72, and electrically coupling the vehicle charger plug 88 to the electrified vehicle 60 establishes a charging circuit 92 extending to the grid power source 72. Power is conveyed from the grid power source 72 through the charging station 64 to the electrified vehicle 60 along the charging circuit 92.

The example charging circuit 92 incorporates a switch 96 that can transition from a first position that permits the charging circuit 92 to convey power to the electrified vehicle 60 to a second position that prevents the charging circuit 92 from conveying power to the electrified vehicle 60. The switch 96 can include a single switch or a plurality of individual switches.

In this example, the switch 96 transitions from the first position to the second position in response to an impact event. The example switch 96 is a passive switch. That is, the switch 96 is not electrically powered and does not require the electrified vehicle 60 to be operating or to be in a keyed-on position in order for the switch 96 to transition from the first position to the second position.

More particularly, the switch 96 includes one or more passive inertia switches that can sense shock or vibration associated with an impact event. The switch 96 can include a weight held within a spring-loaded cage. A shock to the switch 96, such as shocks and high G-forces resulting from an impact event, can move the weight relative to the cage. If the weight moves enough, the spring bias of the cage is released and the switch 96 transitions from the first position to the second position. The switch 96 can, in some examples, require a manual reset of the spring-loaded cage to transition the switch 96 from the second position back to the first position. In other examples, switches other than a passive inertia switch are used.

The impact event, in this example, causes the switch 96 to transition from the first position, where charging is permitted, to the second position, where charging is prevented. In particular, the switch 96 transitions in response to shocks, vibrations, or both, that result from the impact event. The switch 96 thus terminates charging of the electrified vehicle 60 in response to the impact event.

Figure 4:
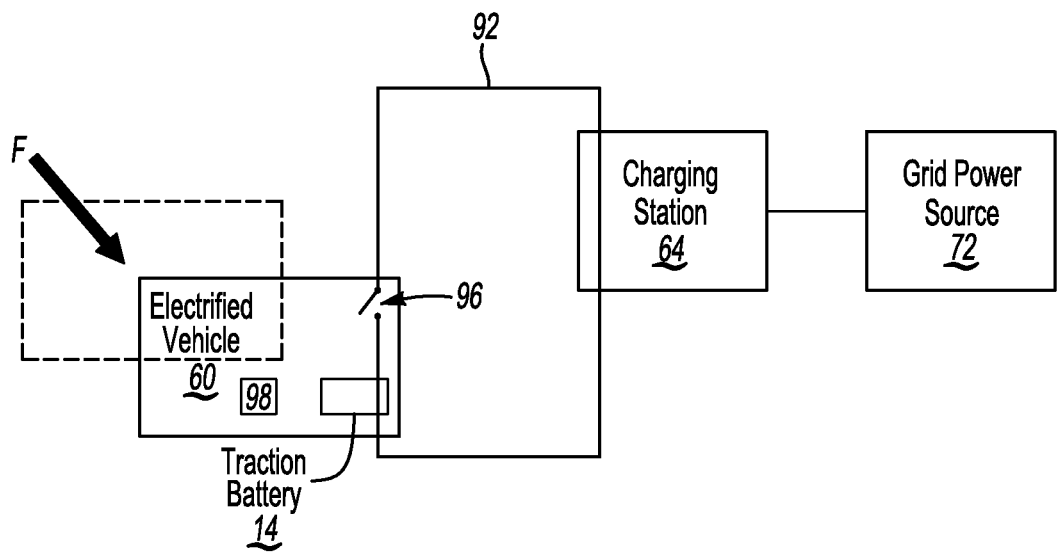
FIG. 4 shows a highly schematic view of the electrified vehicle and the charging station of FIG. 2 after an exemplary impact event.

FIG. 4 shows the electrified vehicle 60 shifted from a charging position shown in FIG. 3 to another position. An example impact event applies a force F to the electrified vehicle 60 in the charging position causing the electrified vehicle 60 to move from the charging position (shown in broken lines in FIG. 4) to another position. The movement of the electrified vehicle 60 and the switch 96 transitions the switch 96 from the first position of FIG. 3 to the second position of FIG. 4.

The example switch 96 is held within the electrified vehicle 60. The switch 96 could be mounted to a frame of the electrified vehicle 60 in a position appropriate for detecting an impact event. In some examples, the switch 96 is mounted to the electrified vehicle 60 very close to wherein the vehicle charger plug 88 electrically couples to the electrified vehicle 60. In some examples, the switch 96 is mounted within a receptacle of the electrified vehicle 60 that electrically couples directly with the vehicle charger plug 88. Mounting the switch 96 at or near where the vehicle charger plug 88 electrically couples to the electrified vehicle 60 can minimize the potential for live voltage in the electrified vehicle 60 after the switch 96 transitions from the first position to the second position in response to an impact event.

In another example, the switch 96 is incorporated into the vehicle charger plug 88 of the charger assembly 68. In such an example, an impact event moves the vehicle charger plug 88, which causes the switch 96 to transition from the first position that completes the charging circuit 92 to the second position that opens the charging circuit.

In yet another example, the charger cable 84 or the charger body 80 holds the switch 96. In such an example, an impact event moves the charger cable 84 or the charger body 80, which causes the switch 96 to transition from the first position that completes the charging circuit 92 to the second position that opens the charging circuit.

In some examples, the switch 96 transitioning from the first position to the second position causes a controller module 98 of the electrified vehicle 60 to wake up even though the electrified vehicle 60 is keyed off. The controller module 98 can wake up from an inactive state and initiate a communication. For example, the controller module 98 can wake up and transmit a message from the electrified vehicle 60, such as a text message, for an operator of the electrified vehicle 60. The message can notify the operator that an impact event has occurred, which may prompt the operator to return to the electrified vehicle 60 or otherwise inspect the electrified vehicle 60.

Features of the disclosed examples include a switch that terminates a charge of an electrified vehicle from a charging station in response to an impact event. The switch transitions in response to forces, such as shocks and vibrations, associated with the impact event. The switch is a passive switch and does not require the vehicle to operate in order to transition from the first position to the second position. Thus, charging can be terminated in response to an impact event even when the vehicle is keyed off.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A charge termination system, comprising:
a switch configured to transition from a first position to a second position in response to movement of an electrified vehicle relative to a charging station; and
a charging circuit extending to an external power source, the switch in the first position permitting the charging circuit to charge the electrified vehicle, the switch in the second position preventing the charging circuit from charging the electrified vehicle, wherein the switch is a passive switch.

2. The charge termination system of claim 1, wherein the switch is an inertia switch.

3. The charge termination system of claim 1, wherein the switch is within the electrified vehicle.

4. The charge termination system of claim 3, wherein the switch is at least partially within a receptacle that engages a vehicle charger plug of the charger assembly.

5. The charge termination system of claim 1, further comprising a charging cord of a charger assembly, the charging cord holding the switch.

6. The charge termination system of claim 1, further comprising a vehicle charger plug of a charger assembly, the vehicle charger plug holding the switch.

7. The charge termination system of claim 1, wherein the switch in the first position permits the charging circuit to charge the electrified vehicle when the electrified vehicle is stationary.

8. The charge termination system of claim 1, wherein the switch is configured to transition from the first position to the second position when the electrified vehicle is in a key-off state.

9. The charge termination system of claim 1, wherein the charging station comprises the external power source.

10. An electrified vehicle charge termination method, comprising:
charging an electrified vehicle using a charging station; and
in response to a relative movement between the electrified vehicle and the charging station, transitioning a switch from a first position that permits the charging to a second position that prevents the charging, wherein the switch is a passive switch.

11. The electrified vehicle charge termination method of claim 10, wherein the electrified vehicle is keyed-off during the charging.

12. The electrified vehicle charge termination method of claim 10, wherein the switch is an inertia switch.

13. The electrified vehicle charge termination method of claim 10, further comprising holding the switch within the electrified vehicle.

14. The electrified vehicle charge termination method of claim 10, further comprising holding the switch within a vehicle charger plug of the charger assembly.

15. The electrified vehicle charge termination method of claim 10, further comprising holding the switch within a charger cable of the charger assembly.

16. The electrified vehicle charge termination method of claim 10, wherein the switch opens a charging circuit extending between a grid power source and the electrified vehicle.

17. The electrified vehicle charge termination method of claim 10, wherein a restraint control module of the electrified is off during the charging.

18. The electrified vehicle charge termination method of claim 10, further comprising transmitting a communication from the electrified vehicle in response to the relative movement, the transitioning, or both.

\* \* \* \* \*

UNITED STATES PATENT AND TRADEMARK OFFICE
CERTIFICATE OF CORRECTION

PATENT NO. : 10,938,225 B2
APPLICATION NO. : 14/931075
DATED : March 2, 2021
INVENTOR(S) : Aed M. Dudar Page 1 of 1

It is certified that error appears in the above-identified patent and that said Letters Patent is hereby corrected as shown below:

In the Claims

In Claim 17, Column 7, Line 7; replace "the electrified is" with --the electrified vehicle is--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*